March 29, 1960  O. L. PATTERSON  2,930,982
SUBTRACTION CIRCUIT
Original Filed July 30, 1951

$E_C = \mu (E_A - E_B) \quad \mu \gg 1$ $E_B = \dfrac{E_H + E_J}{2} \qquad E_A = \dfrac{E_G}{2}$ $E_C = E_J = -\mu \left( \dfrac{E_H + E_J}{2} - \dfrac{E_G}{2} \right)$ $E_J = \dfrac{\mu}{\mu+2} (E_G - E_H) \rightarrow E_G - E_H$

INVENTOR.
OMAR L. PATTERSON
BY
ATTORNEYS

United States Patent Office 2,930,982
Patented Mar. 29, 1960

2,930,982

SUBTRACTION CIRCUIT

Omar L. Patterson, Media, Pa., assignor to Sun Oil Company, Philadelphia, Pa., a corporation of New Jersey Original application July 30, 1951, Serial No. 239,279, now Patent No. 2,855,145, dated October 7, 1958. Divided and this application October 22, 1952, Serial No. 316,173

10 Claims. (Cl. 328—158)

This invention relates to computing circuits and has particular reference to a subtraction circuit of improved type.

This application is a division of my application Serial No. 239,279, filed July 30, 1951, now Patent No. 2,855,145. Reference may further be made to my prior applications Serial Nos. 130,270 and 196,480, now Patent No. 2,788,938, filed respectively November 30, 1949, and November 18, 1950, the first of which issued on December 20, 1955, as Patent No. 2,727,682.

Electronic computing circuits are frequently only approximate in their computing functions and, in particular, are usually sensitive to voltage variations and changes in characteristics in component elements particularly thermionic tubes. Accordingly, using circuits heretofore known, computations could be carried out to only a very limited degree of accuracy.

In accordance with the present invention there is provided a subtraction circuit of high accuracy and very substantial independence of tube characteristics. As will appear hereafter, there is utilized a high gain differential amplifier which serves as an element of a novel subtraction circuit. The use of this high gain differential amplifier is particularly responsible for the accuracy of the computations involved and their independence of tube characteristics.

The general object of the present invention relates to the provision of a subtraction circuit of high accuracy, the term "subtraction circuit" being used in a broad sense as will hereafter appear.

Figure 1:
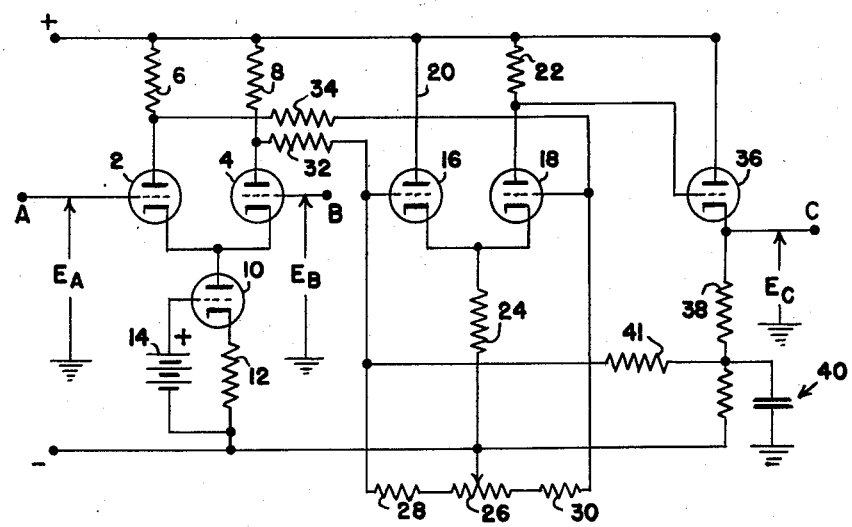
Figure 2:
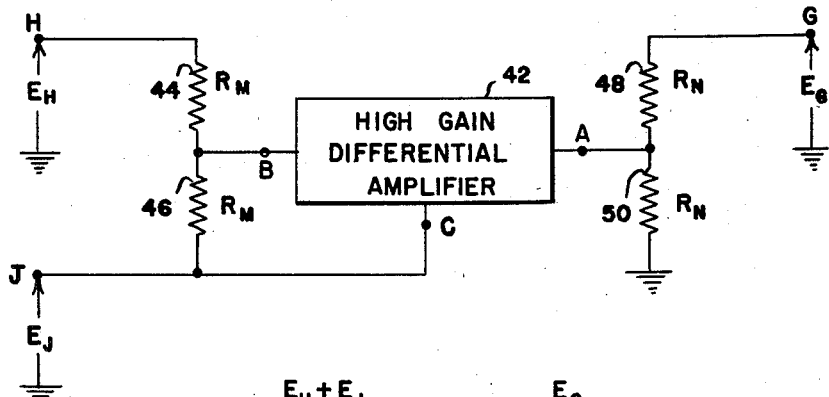

The attainment of the foregoing object and other objects of the invention, particularly relating to details of construction and operation, will become apparent from the following description read in conjunction with the accompanying drawings, in which:

Figure 1 is a wiring diagram of a high gain differential amplifier used as an element of the subtraction circuit; and Figure 2 is a diagram showing a highly accurate subtraction circuit involving the use of the high gain differential amplifier of Figure 1.

The subtraction circuit utilizes a differential amplifier the nature of which will be first described.

A preferred form of high gain differential amplifier is illustrated in Figure 1 and is of the type described in "Vacuum Tube Amplifiers," volume 18, Radiation Laboratory Series, page 485, McGraw-Hill, 1948. It will be noted that this differential amplifier is, in many respects, similar to that disclosed in my application, Serial No. 196,480, now Patent No. 2,788,938. It involves an improvement thereover in the provision of a constant current triode.

A pair of triodes 2 and 4 have their grids connected to the input terminals A and B. These triodes are provided with anode load resistors 6 and 8 and their cathodes are connected together and to the anode of a triode 10 arranged in a cathode follower circuit, there being provided the cathode load resistor 12. A battery 14 or other source of fixed potential is connected between the remote end of the cathode resistor 12 and the grid of triode 10.

The grids of a pair of triodes 16 and 18 are respectively connected through resistances 32 and 34 to the anodes of triodes 4 and 2. The anode of triode 16 is connected directly to the positive potential supply line. The anode of triode 18 is connected to the same supply line through a load resistor 22. The cathodes of triodes 16 and 18 are connected to each other and to a common cathode load resistor 24 which is, in turn, connected to a negative potential supply line. To this line there is also connected the contact of a potentiometer 26 which is connected respectively through resistances 28 and 30 to the grids of triodes 16 and 18. An output triode 36 is connected in a cathode follower circuit, its cathode being connected to the negative potential supply line through a resistor 38 and a resistance-capacitance network indicated at 40. Feedback is provided through resistance 41 to the grid of triode 16. The grid of triode 36 is connected to the anode of triode 18 and the anode of triode 36 is connected to the positive potential supply line. The output terminal C is connected to the cathode of triode 36.

With a balancing adjustment properly made at potentiometer 26, the action of this differential amplifier is to provide at the output terminal C a potential $E_C$ which is related to the input potentials at terminals A and B, namely, $E_A$ and $E_B$ in accordance with the expression given below the circuit diagram in Figure 1. By virtue of the amplification which is provided in the circuit, the constant $\mu$ has a value greatly exceeding unity and, in fact, with a proper choice of circuit constants, this factor may have a value as high as 10,000.

In the case of the differential amplifier circuit illustrated and described in said Patterson application, Serial No. 196,480, now Patent No. 2,788,938, the cathodes of the triodes corresponding to 2 and 4 are connected to the negative supply line through a resistor. When such a connection is made, the expression for $E_C$ contains an additional term involving the sum of the potentials $E_A$ and $E_B$. This common mode of these potentials is substantially completely eliminated by the provision of the triode 10 and its connections in place of a fixed resistance, the action of this triode being to provide a constant total current from the cathodes of triodes 2 and 4. As will be evident, this constant current condition results from the fact that the cathode potential of triode 10 with respect to the lower end of resistor 12 is maintained substantially constant by the provision of the battery 14, the positive terminal of which is connected to the grid of triode 10. It will be evident, therefore, that if the triodes 2 and 4 are similar in their characteristics, as they desirably should be, a simultaneous change of potential of the grids of both in the same sense and amount will result in no change of the currents through the load resistors 6 and 8 and, consequently, no output signals to the grids of the triodes 16 and 18. When, therefore, the triodes 2 and 4 are similar to each other and the triodes 16 and 17 are also similar to each other, and minor differences are subjected to substantial elimination by adjustment at potentiometer 26, the expression given below the circuit diagram holds to a high degree of accuracy and the output potential is extremely sensitive to differences between the input potentials. As will appear hereafter, this condition may be utilized in securing a high precision of equality between various potentials, in view of the high value of the factor $\mu$. The high numerical value of this factor may be also utilized to secure ratios, as will appear hereafter, which are very nearly equal to unity.

A highly important feature of the differential amplifier as a basic computer element, especially for long time operation, is mutual cancellation of effects of heater voltage variation and "aging" of tube characteristics.

While the foregoing describes a preferred form of differential amplifier, other differential amplifiers may be utilized in the subtraction circuit which will now be described with particular reference to Figure 2.

In this subtraction circuit the high gain differential amplifier of Figure 1 is indicated at 42, its terminals A, B and C being indicated in Figure 2 to correspond with those in Figure 1. The terminal B is connected to the junction of a pair of resistors 44 and 46 which initially may be considered to have the same resistance value $R_M$. The terminal A is similarly connected to the junction of a pair of resistors 48 and 50 which may also be assumed to have the same resistance value $R_N$. The upper end of resistor 48 is connected to a terminal G, while the lower end of resistor 50 is grounded. The upper end of resistor 44 is connected to a terminal H, while the lower end of resistor 46 is connected both to the terminal C and an output terminal J. Terminals G and H constitute input terminals for the subtraction circuit. That the output potential $E_J$ appearing at terminal J is very precisely equal to the difference of the input potential $E_G$ and $E_H$ appearing at terminals G and H will be evident from consideration of the expressions given below the circuit diagram in Figure 2. When the value of $\mu$ is very large, as previously described, it will be evident that the fractional factor involved in the last line of the expressions is very nearly equal to unity. Accordingly, an output potential is provided which is substantially equal to the difference of the input potentials. It will be evident that, even though the value of $\mu$ may vary from one high gain differential amplifier to another, or during the use of an amplifier because of changes in tube characteristics, the subtraction circuit output is highly independent of any such variations of operating characteristics of the differential amplifier. The circuit is also capable of handling a very wide range of both positive and negative potentials.

In particular, it is to be noted that this subtraction circuit does not involve any additive term derived from tube potentials or other source as do subtraction circuits, heretofore known. This fact is particularly important in uses of the subtraction circuit for integration or differentiation.

While equality of the resistors of the two pairs illustrated in Figure 2 has been assumed and is necessary for true subtraction, it will be evident that various factors may be introduced if those resistances are not so paired while, nevertheless, there will be secured an output having definite numerical relationship to the inputs and highly independent of the characteristics of the tubes of the differential amplifier.

It may be noted that the terminals A and B in the circuit of Figure 2 may be interchanged, the only result being the change of sign of the numeral 2 in the denominator of the fraction in the last expression given in Figure 2.

What is claimed is:

1. A subtraction circuit comprising a high gain differential amplifier having two input terminals and a cathode follower output terminal and providing an output relative to a reference datum which is a large multiple of the difference of its inputs, a pair of connected impedances having their junction connected to one of said input terminals, a second pair of connected impedances having their junction connected to the other of said input terminals, and a connection between the end of one of said impedances and said output terminal, said connection imparting to the last mentioned impedance end potential changes relative to said reference datum appearing at said output terminal.

2. A subtraction circuit comprising a high gain differential amplifier having two input terminals and a cathode follower output terminal, and providing an output relative to a reference datum which is a large multiple of the difference of its inputs, a pair of connected equal impedances having their junction connected to one of said input terminals, a second pair of connected equal impedances having their junction connected to the other of said input terminals, and a connection between the end of one of said impedances and said output terminal, said connection imparting to the last mentioned impedance end potential changes relative to said reference datum appearing at said output terminal.

3. A subtraction circuit comprising a high gain differential amplifier having two input terminals and a cathode follower output terminal and providing an output relative to a reference datum which is a large multiple of the difference of its inputs, a pair of connected resistances having their junction connected to one of said input terminals, a second pair of connected resistances having their junction connected to the other of said input terminals, and a connection between the end of one of said resistances and said output terminal, said connection imparting to the last mentioned resistance end potential changes relative to said reference datum appearing at said output terminal.

4. A subtraction circuit comprising a high gain differential amplifier having two input terminals and a cathode follower output terminal and providing an output relative to a reference datum which is a large multiple of the difference of its inputs, a pair of connected equal resistances having their junction connected to one of said input terminals, a second pair of connected equal resistances having their junction connected to the other of said input terminals, and a connection between the end of one of said resistances and said output terminal, said connection imparting to the last mentioned resistance end potential changes relative to said reference datum appearing at said output terminal.

5. A subtraction circuit comprising a reference terminal, a pair of impedances connected in series between a first input terminal and an output terminal, and a high gain differential amplifier having two input terminals and an output terminal with one of its input terminals connected to the junction of said pair of impedances and with its output terminal connected to the first mentioned output terminal to enforce substantial equality of the potentials of the two amplifier input terminals with respect to said reference terminal, thereby to provide between the first mentioned output terminal and said reference terminal a potential substantially equal to a linear difference function of the potentials of said first input terminal and the other of said amplifier input terminals with respect to said reference terminal.

6. A subtraction circuit according to claim 5 in which said impedances are resistances.

7. A subtraction circuit comprising a reference terminal, a first pair of impedances connected in series between a first input terminal and an output terminal, a second pair of impedances connected in series between a second input terminal and said reference terminal, and a high gain differential amplifier having two input terminals and an output terminal with its input terminals connected respectively to the junctions of the first and second pairs of impedances and its output terminal connected to the first mentioned output terminal to enforce substantial equality of the potentials of the two amplifier input terminals with respect to said reference terminal, thereby to provide between the first mentioned output terminal and said reference terminal a potential substantially equal to a linear difference junction of the potentials of said first and second input terminals with respect to said reference terminal.

8. A subtraction circuit according to claim 7 in which said impedances are resistances.

9. A subtraction circuit according to claim 8 in which said resistances are substantially equal so that said linear difference function is substantially the difference of the potentials of said first and second input terminals with respect to said reference terminal.

10. A circuit comprising a reference terminal, a pair of impedances connected in series between a first input terminal and an output terminal, and a high gain differential amplifier having two input terminals and an output terminal with one of its input terminals connected to the junction of said pair of impedances and with its output terminal connected to the first mentioned output terminal to enforce substantial equality of the potentials of the two amplifier input terminals with respect to said reference terminal.

References Cited in the file of this patent
UNITED STATES PATENTS

| | | |
|---|---|---|
| 2,567,532 | Stephenson | Sept. 11, 1951 |
| 2,581,456 | Swift | Jan. 8, 1952 |
| 2,640,883 | Buchner | June 2, 1953 |
| 2,676,286 | Buchner | Apr. 20, 1954 |
| 2,682,607 | Schmitt et al. | June 29, 1954 |

OTHER REFERENCES

Article—"Electrical Analogue Computing," Part I; pages 178–180 of Electronic Engineering; June 1947 issue.

Waveforms, Chance et al., vol. 19, Radiation Laboratory Series, pages 360–361 and 642–643, McGraw-Hill Book Co., N.Y., 1949.

Article—"Designing an Office Size Electronic Analog Computer," pages 94–99, 230–232 and 234; April 1951 issue of Electrical Manufacturing.